United States Patent [19]
Barnard

[11] Patent Number: 4,597,463
[45] Date of Patent: Jul. 1, 1986

[54] ELECTRIC VEHICLE USING THE VEHICLE'S KINETIC AND MECHANICAL POWER TO REGENERATE IT'S ENERGY STORAGE DEVICE

[76] Inventor: Richard Barnard, 2330 Olive Ave., Fremont, Calif. 94538

[21] Appl. No.: 573,034

[22] Filed: Jan. 23, 1984

[51] Int. Cl.⁴ .................... B60K 9/00; B60K 13/02; G05G 1/00
[52] U.S. Cl. ..................... 180/165; 74/572; 180/65.3
[58] Field of Search ............. 180/165, 65.3; 74/572

[56] References Cited
U.S. PATENT DOCUMENTS

| | | | |
|---|---|---|---|
| 4,222,450 | 9/1980 | Fobbs | 180/165 |
| 4,254,843 | 3/1981 | Han et al. | 415/2 A |
| 4,282,947 | 8/1981 | Kemper | 180/165 |
| 4,333,553 | 6/1982 | Hoppie et al. | 180/165 |

Primary Examiner—John J. Camby

[57] ABSTRACT

An electric vehicle with combustible fuel capability having an electrocombustible drive engine. A first and second storage battery having a D.C. voltage capacity can be spread to a chopper which provides the input voltage to the electro portion of the engine. A controller accessible to the operator of the vehicle determines the quantity of voltage. A 1st clutch is designed so it can connect or disconnect a 1st flywheel to the motorshaft, connect or disconnect a 1st generator to the motorshaft if its not operated off the first flywheel, and connect or disconnect the 1st generator to the 1st flywheel if it is desired to operate the 1st generator off the 1st flywheel when the flywheel is not connected to the motor shaft and is operating off its stored kinetic and mechanical power. A second generator would be operated from a fan which would be a velocity dependent part of the vehicle. A 3rd generator would operate similar to the 1st generator except it would be connected to the velocity dependent rear axle of the vehicle. A 4th and 5th generator would be operated off individual kinetic, mechanical storage devices that have stored power by means of rubberbands or springs. A 1st and 2nd torque release devices can disconnect the 1st and 2nd kinetic, mechanical storage devices from the 1st and 2nd flywheel or a velocity dependent portion of the vehicle.

15 Claims, 4 Drawing Figures

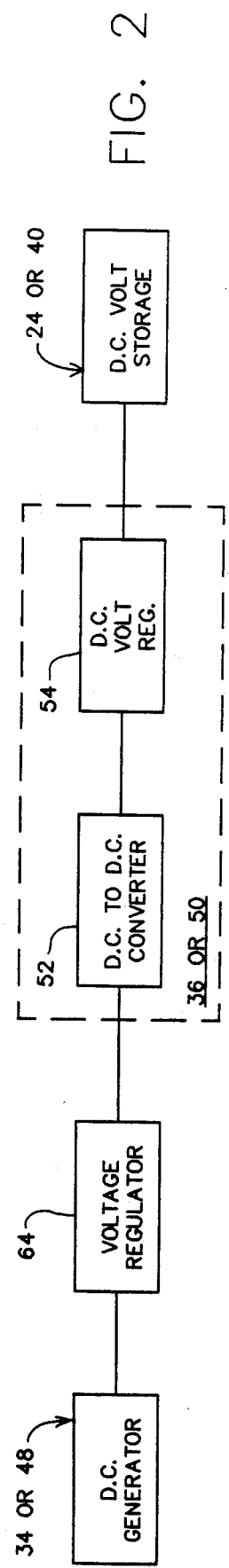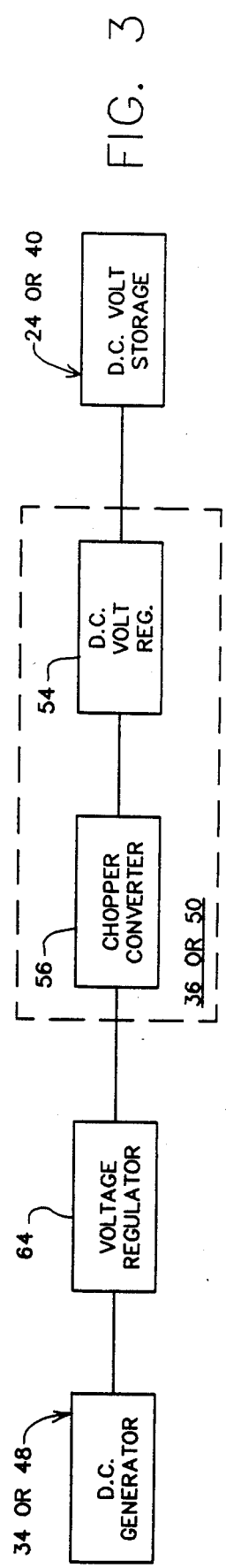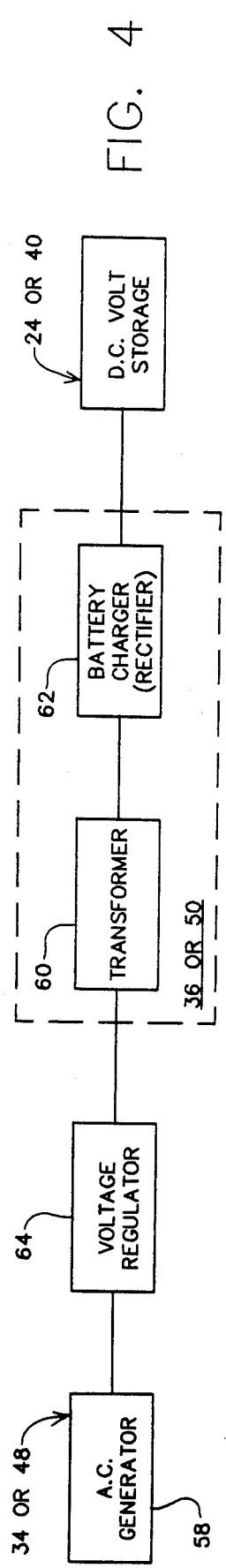

ELECTRIC VEHICLE USING THE VEHICLE'S KINETIC AND MECHANICAL POWER TO REGENERATE IT'S ENERGY STORAGE DEVICE

BACKGROUND OF THE INVENTION

The present invention relates to a novel and useful design for an electric vehicle having regenerative capabilities.

Although the electric car is not a new concept, many problems still exist which prevent the electric car from becoming a commercial reality. Present day electric cars have been developed which use electrical energy stored in a battery or batteries. After a relatively short use, these batteries must be recharged for a considerable long time. In regard to solving this problem, U.S. Pat. No. 4,025,860 to Shibata describes a system for producing an electric vehicle using two types of batteries for different driving situations to increase the range of the electric vehicle. This system could be used to feed the electro portion of the electrocombustable drive engine.

U.S. Pat. No. 3,899,041 to Mager describes an electric vehicle which employs a Jones Chopper for controlling the motor. This system could be used to control the flow of voltage to the motor means.

U.S. Pat. No. 3,818,292 to Bermon shows a foot peddle system for an electric vehicle which employs a permanente magnet which is used to control the frequency of a fixed pulse width chopper. A battery current is applied by the copper to the drive motor. The circuitary of this could be used to control operation of the electro portion of the engine of the present invention if the electro portion was being used as the drive for the vehicle.

U.S. Pat. No. 3,874,472 provides for the use of a low power gasoline engine, however, it is only used to recharge the main banks of batteries for an electric vehicle and can only do so while it is in operation.

U.S. Pat. No. 3,972,380 illustrates an electric engine used only to drive the vehicle.

U.S. Pat. No. 4,034,280 describes a DC—DC power converter which employes a chopper, current source inverter, and square wave generator to produce an alternating current. A transformer is then used in conjunction with a rectifier to change the voltage of DC input power. This system could be used to control voltage used with the present invention.

U.S. Pat. No. 3,367,438 to Moore provides for an electric engine and a combustable engine to drive the vehicle. The combustable engine is also used to recharge a storage battery. This vehicle can only regenerate the storage batteries while it has a velocity or is in the idle position.

Germany Pat. No. 2,823,225 to Lauster provides a hybrid transmission and a motor generator as the drive unit.

U.S. Pat. No. 4,002,218 to Horvet provides an electric drive engine, a fan operated generator, and a axle driven generator. It cannot regenerate the storage battery while the motor means is deactivated or the vehicle is stopped.

U.S. Pat. No. 3,861,485 and 3,923,115 teach the use of flywheels to store energy from an electric vehicle. These systems might be used to provide additional power to operate the present inventions generation equipment, however, it is not likely they would perform well using the present inventions concepts.

Although attempts have been made to regenerate electrical power by use of auxiliary engines and other hybrid devices, or recharge the storage batteries of an electric vehicle, none of the prior devices employs the regenerative potential of the drive engine alone as well as the regenerative potential from the movement of the vehicle to re-energize the storage device in all modes of operation of the vehicle including the stopped position with the motor means deactivated. None of the prior art has recognized the full potential of the stored kinetic and mechanical power of the vehicle itself and have not come to a realization that this power can be taped at any time while the vehicle has a velocity. None of the prior art devices can regenerate an electric voltage three ways in a single vehicle e.g. while the vehicle has a velocity, in the idle position, or while the motor means is deactivated and the vehicle is in the stopped position. None of the prior art shows a 3rd, 4th, and 5th generator means. None of the prior art shows a kinetic, mechanical storage device that allowes the vehicle to regenerate the storage device when the vehicle has been stored for a period of time.

My regenerative electric vehicle is the only one that uses velocity and nonvelocity dependent parts of the vehicle to store or use the vehicles kinetic and mechanical power to regenerate the vehicles energy storage device while the vehicle is in motion, in the idle mode, or while the vehicle is stopped with the motor means deactivated. My vehicle is the only one that can store the vehicles kinetic or mechanical power for an indefinite period of time to be used at any future date. My electric vehicle is the only one shown that uses five seperate generator means that allows the stored or unstored kinetic and mechanical power to regenerate a energy storage device or devices. My vehicle is the only one that can regenerate the energy storage device after the motor means is deactivated and the flywheels have stopped movement.

None of the prior art references suggest or shows these functions. None of the prior art references describes or suggest the structure which would perform these functions individually or jointly.

SUMMARY OF THE INVENTION

In accordance with the present invention a novel and useful electrical vehicle having increased regeneration capabilities is provided.

The electric vehicle of the present invention includes an electrocombustible motor means for driving the electric vehicle. Chopper menas can be provided which obtains the DC voltage from the first means for storing electrical energy and transforms the same into the pulsating voltage required to actuate the electro portion of the motor means. The quantity of voltage passing to the motor means from the chopper means may be determined by means for controlling the quantity of the voltage. Such controlling means may take the form of an accelerator peddle, throttle, or other device familiar to operators of vehicles.

The electric vehicle includes 1st generator means which produce electrical voltage. The first generator means can be connected to the mechanical output of the motor means, i.e. the motor shaft which generally controls the speed of the electric vehicle, however, an electric or mechanical clutch can disconnect the first generator means from the mechanical output of the motor shaft and connect it to the output of the first flywheel means which can operate the first generator means from the stored kinetic and mechanical power of the vehicle. The first flywheel means would have stored its mechanicle and kinetic power while it was attached to the motorshaft of the electrocombustible means. A clutch means would have allowed the first flywheel means and the first generator means to be connected simultaneously to the motor shaft or individually depending on the desired function. The output of the first generator means is fed to means for charging the first means for storing electrical energy.

A second generator means is also included in the present invention using as its mechanism input, a velocity dependent moving portion of the electrical vehicle. Such a portion may be a fan which is turned by movement of air past the vehicle, or any other similar item. The output of the second generator means is fed into means for charging the first storage means. A fourth generator means which is connected to a kinetic, mechanical power storage means that can be connected directly to a velocity dependent part of the vehicle such as the front axle or the first flywheel means depending on the desired use to store the vehicle's kinetic or mechanical power to operate the fourth generator means. The output of the fourth generator means is fed into means for charging the first storage battery. A third generator means is provided and my be connected to the rear axle of the vehicle similar in operation to the first genertor means. The output of the second generator means is fed into means for charging the second storage means. A fifth generator means is provided similar in operation to the fourth generator means except it would be connected to the second flywheel means in the rear of the vehicle. The output of the fifth generator means can be fed into means for charging the second storage means. The first and second storage means may be connected electrically in series for supply to the electro portion of the electro-combustible means via the chopper means and the chopper control, heretofore described. The first and second flywheel means are designed to store the kinetic and mechanical power of the vehicle to operate the first and third generator means at selected velocities or when the first and third generator means are not connected to the output of the motorshaft or the rear axle, however, the first and third generator means can be operated off the first and second flywheel means when the said flywheels are connected directly to the motorshaft and the rear axle of the vehicle and the first and third generator means are connected to the output of said flywheels. A first and second clutch means will determine the connection of said flysheels and said generator means to the said motorshaft, and rear axle. Said clutch means will also determine connection of said flywheels to said generators and also connection of said flywheels to said kinetic mechanical storage device which operate said fourth and fifth generator means.

It may be apparent that a novel and useful electric vehicle having electrical regeneration capabilities not shown in the prior art is provided.

It is therefore an object of the present invention to provide an electric vehicle which employs five seperate generator means for recharging the electric storage capacity of the same.

It is another object of the present invention to provide an electric vehicle which possesses the capability of regenerating power by the recovery of kinetic and mechanical power of the vehicle to operate generation equipment.

It is yet another object of the present invention to provide an electric vehicle which has a substantially longer range than electric vehicles of the prior art.

It is still another object of the present invention to provide an electric vehicle which includes a multiplicity of recharging circuits which are linked to provide sufficient power for the motivation of the electric vehicle as well as for the operation of vehicle accessories such as lights, radios, and the like.

It can be another object of the invention to show a electric vehicle that can generate electric energy while the vehicle is in motion, in the idle mode, and when the vehicle is stoped with the motor means deactivated.

It is also another object to show an electric vehicle that can regenerate a storage device after long periods of storage.

The invention possesses other objects and advantages especially as concerns particular characteristics and features thereof which will become apparent as the specification continues.

BRIEF DESCRIPTION OF THE DRAWINGS

FIG. 2 is a schematic block diagram illustrating an embodiment of the recharging portion of the present invention.

FIG. 3 is a schematic block diagram illustrating an embodiment of the recharging portion of the present invention.

FIG. 4 is a schematic block diagram illustrating an embodiment of the recharging portion of the present invention.

Figure 1:
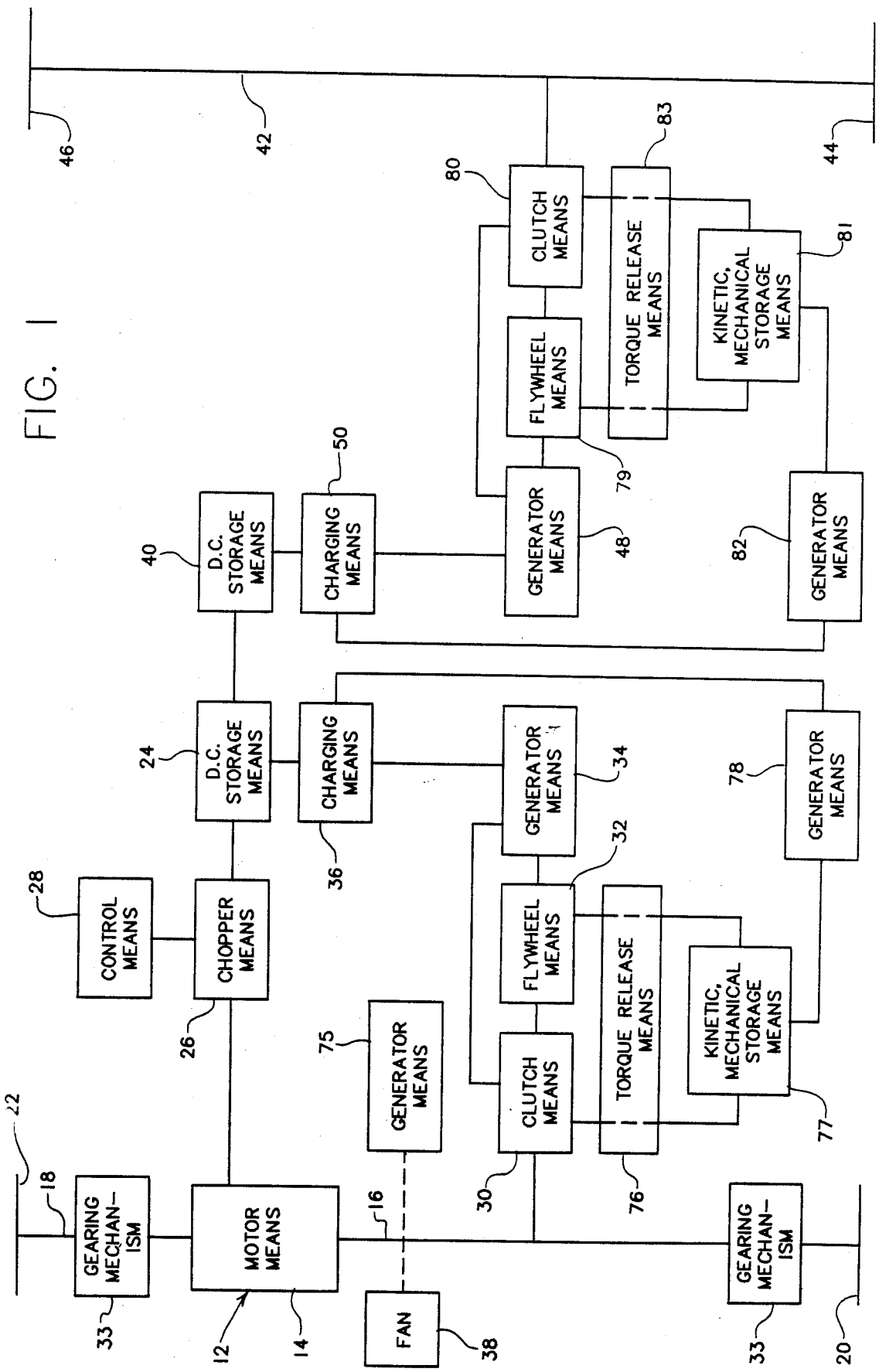
FIG. 1 is a schematic block diagram depicting the overall scheme of the present invention.

Various aspects of the present invention will evolve from the following detailed description which should be taken in conjunction with the above delineated drawings.

DESCRIPTION OF THE PREFERRED EMBODIMENTS

The following embodiments of the present invention should be understood and interpreted in accordance with the heretofore described drawings.

The invention as a whole is depicted by reference character 10 and includes as one of its elements electrocombustible engine 14 as shown by Richard Barnard in his patent application mailed 10/23/83 to the Patent and Trademark Department. The vehicle can also operate and perform all functions shown using standard electric motors commonly known in the art. It is anticipated that the electro portion of the engine 14 would be operated by a pulsating DC current and include the feature of a traction series winding. The mechanical output of motor means 14 would take the form of motorshaft 16 and motorshaft 18 which connect to wheels 20 and 22 (shown schematically on FIG. 1) respectively. Electrocombustible means 14 may be rated approximately 500 V. DC storage means 24 may be of the zinc chloride genre. Reference is made to U.S. Pat. No. 4,025,860 which describes a hybrid battery system which may be easily incorporated into and substituted for DC storage means 24. The DC voltage from storage means 24 can be fed into chopper means 26, which provides a pulsating voltage to electrocombustible means 14 for activation of the electro portion of the motor. Chopper means 26 may be a Jones SCR Chopper, class D, manufactured by the General Electric Co. and identified in U.S. Pat. No. 3,899,041, column 2, Lines 47-60. Control means 28 would provide the proper quantity of voltage to motor means 14 which in turn would operate the vehicle at proper mechanical speed. With reference to U.S. Pat. No. 3,818,292, control means 28 may be the type of device described therein and will not be described further hereinafter. I make no claim to the Mager circuitary U.S. Pat. No. 3,899,041. The novelty lies in my electrical generation mechanism rather than the usage of the same which is shown by a Mager type circuit.

Connected to output shaft 16 of electrocombustible engine 14 is first clutch means and first flywheel means 30 and 32. First generator means 34 connects to first flywheel means 32. First clutch means 30 can disconnect first flywheel means 32 from output shaft 16 allowing the stored kinetic and mechanical power of first flywheel means 32 to operate first generator means 34. Clutch 30 controlled by computer means can electrically disconnect first flywheel means 32 from first generator means 34 and electrically connect first generator means 34 directly to output shaft 16 allowing direct input from motorshaft 16 to first generator means 34. While this mode of operation is operating first generator means 34 first flywheel means 32 would, in most cases, be disconnected from motorshaft 16 and its rotations caused by prior attachment to motorshaft 16 allowing flywheel 32 to store kinetic and mechanical power could be electrically connected to the first kinetic and mechanical storage means 77 allowing the first kinetic, mechanical storage device 77 to store, for indefinite periods of time, the stored kinetic and mechanical power of first flywheel means 32. First torque release means 76 would disconnect first flywheel means 32 from the first kinetic, mechanical storage device 77 when sufficient power was stored for future use. First electric clutch means 30 controlled by computer means may also electrically connect the first kinetic, mechanical storage device 77 directly to motor shaft 16 for direct input from the electrocombustible drive engine 14 of its mechanical power to be stored by the first kinetic Mechanical storage means 77. When the first kinetic, mechanical storage means 77 is connected directly to the motorshaft 16 it would be disconnected from first flywheel means 32. When first generator means 34 is electrically connected directly to motorshaft 16 it would be disconnected from first flywheel means 32. First flywheel means 32 can operate first generator means 34 and the first kinetic, mechanical storage means 77 simultaneously or individually. Motorshaft 16 can operate first flywheel 32 while first generator means 34 is connected to flywheel means 32. Motorshaft 16 can operate first flywheel means 32 while the first kinetic, mechanical storage means 77 is connected to first flywheel means 32. First electric clutch means 30 will electrically control the mode of operation of first flywheel means 32, first generator means 34 and the first kinetic, mechanical storage means 77. Operation and control of first clutch means 30 can be done mechanically or electrically by means commonly known in the art such as computer control, electrically operated relays, contactors, mechanical torque release and connect devices. The above described operations of first flywheel means 32, first clutch means 30, and the first kinetic, mechanical means 77 will allow first generator means 34 to supply a input voltage to charger means 36 to recharge the energy storage means 24 while the vehicle has a velocity, while in the idle mode or the vehicle is stopped and the motor means 14 is deactivated e.g. if first generator means 34 were electrically connected directly to motorshaft 16 operation of the electrocombustible engine would operate the first generator means 34 at any velocity of the vehicle including the idle position. In some cases it may be desireable to use the combustible mode of operation of the electrocombustible engine 14 to operate the first generator means 34, however, electrical or combustible operation of the electrocombustible engine 14 will operate motorshaft 16 and give a mechanical input to first generator means 34 for its operation. If motorshaft 16 is operating first flywheel means 32 and first generator means 34 were electrically connected to first flywheel means 32 the operation of first flywheel means 32 will cause first generator means 34 to produce a voltage to the charging means 36 for input to the energy storage device 24. If first clutch means 30 were electrically activated to disconnect first flywheel means 32 from motorshaft 16 while the vehicle had a velocity first flywheel 32 would continue to operate because of its stored kinetic, mechanical power and continue to operate first generator means 34. The vehicle could stop and deactivate its electrocombustable means 14 and first flywheel means 32 would still be operating first generator means 34 allowing the vehicle to generate a voltage when the vehicle was stoped and the motor means 14 is deactivated. If first flywheel means 32 is connected to the first kinetic, mechanical storage means 77 and the first kinetic, mechanical storage means 77 stored its full capacity of kinetic and mechanical power and the first torque release means 76 disconnected the kinetic, mechanical means 77 from first flywheel means 32 stored kinetic, mechanical power would be available for use at any future time. The vehicle could stop, deactivate the electrocombustible means 14 and be stored. The kinetic, mechanical storage means 77 could be electrically activated while the vehicle is in storage and cause input power to the fourth generator means 78 which would cause an input voltage to charging means 36 and partially recharge the energy storage means 24. Thus allowing the vehicle to be partially recharged while stored. The operation of the first kinetic, mechanical storage means 77, fourth generator means 78, charging means 36 could also perform while the vehicle has a velocity.

Fan 38 is connected to second generator means 75. Fan 38 would operate from the movement of air past vehicle 10 during its operation and is therefore substantially velocity dependent with the exception of the situation where vehicle 10 lies idle in the wind.

Turning to the oppisite end of vehicle 10 from electrocombustible means 14 it may be seen that a second DC storage means or DC battery 40 is provided. DC storage means 40 may take the form of the same battery pack as DC storage means 24 as shown in the preferred embodiment, DC storage means 24 and 40 are connected in series. Axle 42 having wheels 44 and 46 serves as the mechanical input for third generator means 48, charging means 50 would be similar, it not identical, to charging means 36. Second clutch means 80 would be similar, if not identical, to first clutch means 30. Second flywheel means 79 would operate similar, if not the same, to first flywheel means 32. Third generator means 48 would provide an input voltage to charging means 50. Second torque release means 83 would have the same function as first torque release means 76 e.g., it can disconnect the kinetic and mechanical device 81 from flywheel 79 when the mechanical torque of the spring or rubberband of the kinetic and mechanical device that is attached to the torque release 83, which is similar in operation to a torque wrench, is great enough to initiate the breaking action of torque release 81 from flywheel 79 disconnecting the two devices thus, not allowing flywheel 79 to continue operation of the spring or rubberband until they are destroyed. The second kinetic, mechanical storage device 81 will perform similar, if not the same, as the first kinetic, mechanical means 77. Fifth generator means 82 will provide an input voltage to charging means 50.

Turning to FIGS. 2-4, it may be seen that DC generator 34 or 48 may feed battery packs 24 or 40 by utilizing a varity of elements. For example, FIG. 2 shows the DC generator feeding a DC to DC converter 52 which may be used to boost the voltage of DC generator to a higher level. Regulator 54 provides the proper input to DC voltage storage 24 or 40 and recharges the same. It should be noted that heat sensing automatic shut off mechanisms may be provided to interrupt the flow of charging the current to battery packs 24 or 40. Such shut-off mechanisms are known in the art and will not be further discussed herein. Turning to FIG. 3, it may be seen that charging means 36 or 50 may include chopper converter 56 such as the system described in U.S. Pat. No. 4,034,280. Again DC voltage regulator 54 may be used to feed storage batteries 24 or 40. Finally, FIG. 4 it may be seen that generator means 34 or 48 may take the form of an AC alternator 58, which could be connected to transformer 60 to produce a boosted AC voltage. Such boosted AC voltage is then fed into battery charger 62, which rectifies the AC electrical current into a DC voltage for charging the battery pack 24 or 40. Voltage regulators 64 stabilize the voltages from generator means 34 or 48 in each of the embodiments, FIGS. 2-4.

In operation, the vehicle 10 of the present invention draws DC voltage from battery packs 24 or 40 into chopper means 26. Control means 28, which may be in the form of an accelerator peddle, controls the quantity of pulsating voltage entering electrocombustible means 14. Electrocombustible means 14 in turn rotates wheels 20 and 22 via shafts 16 and 18. Gearing 33 controls the turning of wheel 20 and 22 in the conventional manner and permits motor means to turn at idle speed. Performance of all other devices will function as shown in the foregoing specifications, embodiments of the present invention. Vehicle 10 thus obtains kinetic and mechanical power to operate the five generator means for recharging battery packs 24 and 40 from velocity dependent parts such as fan 38, and rear axle 42 as well as from non-velocity dependent parts such as motor shaft 16. Vehicle 10 possesses the electrical power and facility to range in excess of electrical vehicles know in the prior art.

While in the foregoing specification, embodiments of the present invention have been set forth in considerable detail for the purposes of making a complete disclosure of the invention, it may be apparent to those of ordinary skill in the art that numerous changes may be made without departing from the spirit and principles of the invention e.g. the fourth and 5th generation means could be left off the vehicle and the first kinetic, mechanical means 77 could be connected to the first generator means for its operation while the vehicle 10 is stored or has a velocity. The second kinetic, mechanical means 81 could be connected to the third generator means for its operation while the vehicle 10 is stored or has a velocity.

What is claimed is:

1. and electrocombustible drive vehicle comprising
   a. motor means for driving the electrocombustible vehicle said motor means being activated by combustible fuel or a pulsating voltage;
   b. first means for storing electrical energy for use as DC voltage;
   c. chopper means for providing a pulsating voltage to said motor means for activation of electro portion of said motor means, said first means for storing electrical energy proving DC voltage input to said chopper means;
   d. means for controlling the quantity of said pulsating voltage supplied to said motor means;
   e. first generator means for producing electrical voltage, said first generator means mechanical input being connected to the direct output of said motor means independent of the movement of said vehicle allowing said generator to produce a voltage while the vehicle is in the idle position;
   f. means for charging said first means for storing electrical voltage produced by said generator;
   g. second means for storing electrical energy for use as a DC voltage;
   h. second generator means for producing electrical voltage, said second generator means mechanical input being connected to a velocity dependent moving portion of electric vehicle independent of said output of said motor means and dependent on air movement relative to the vehicle, means for selectively charging said first and second means for storing electrical voltage employing said electrical voltage produced by said second generator means;
   i. means for charging said second means for storing electrical energy employing said electrical voltage produced by said chopper means;
   j. third generator means for producing electrical voltage, said third generator means mechanical input being connected to a velocity dependent moving portion of electric vehicle independent of said output of said motor means and dependent on the movement of the rear axle, means for selectively charging said first and second means for storing electrical voltage employing said electrical voltage produced by said third generator means thus, connection to the rear axle allows said third generator means to produce a voltage while the vehicle has a velocity;
   k. first and second kinetic, mechanical storage means for storing kinetic, mechanical power produced by the mechanical output of said motor means, and the kinetic, mechanical output of velocity dependent parts of the vehicle, means for selecting connection to said mechanical and velocity outputs, means to release stored power at selected times;
   l. fourth generator means for producing electrical voltage, said fourth generator means mechanical input being connected to said first kinetic, mechanical storage means independent of said output of said motor means and dependent on the movement of said first kinetic, mechanical storage means, means for selectively charging said first and second means for storing electrical voltage employing said electrical voltage produced by said fourth generator means thus, operation of said fourth generator means will allow energy to be produced while the vehicle is stopped, stored, and the vehicle's motor means is deactivated;

m. fifth generator means for producing electrical voltage, said fifth generator means mechanical input being connected to said second kinetic, mechanical storage means independent of said output of said motor means and dependent on the movement of said second kinetic, mechanical storage means, means for selectively charging said first and second means for storing electrical voltage employing said electrical voltage produced by said fifth generator means thus, operation of said fifth generator means will allow energy to be produced while the vehicle is stopped, stored, and the vehicles said motor means is deactivated;

n. first flywheel means for storing kinetic, mechanical power and first clutch means for disconnecting and connecting said flywheel means to the front axle at a selected range of velocities;

o. second flywheel means for storing kinetic, mechanical power and second clutch means for disconnecting and connecting said flywheel means to the rear axle at selected range of velocities;

p. first and second torque release means that allows connect or disconnect of said first and second kinetic, mechanical storage means from said output of said motor means and said velocity dependent parts of the vehicle when full charge of power has been retained;

q. kinetic energy shown as $KE = \frac{1}{2}MV^2$ and the resulting H.P. us used to operate said generation equipment at any velocity.

2. The electrocombustable vehicle of claim 1 in which said first clutch means controls selection of said first kinetic mechanical storage device in its storage of power from said front axle or said first flywheel means.

3. The electrocombustable vehicle of claim 1 in which said second clutch means controls selection of said second kinetic, mechanical storage device in its storage of power from said rear axle or said second flywheel means.

4. The electrocombustable vehicle of claim 1 in which the vehicle includes front and rear axle and said motor means is directly connected for turning the front axle and said first flywheel is connected to said front axle and said first generator means mechanical input being connected to said direct output of said first flywheel means.

5. The electrocombustable vehicle of claim 1 in which said second flywheel is connected to said rear axle and said third generator means mechanical input being connected to said direct output of said second flywheel means.

6. The electrocombustible vehicle of claim 1 in which said first clutch means connects or disconnects said first generator means to front axle.

7. The electrocombustible vehicle of claim 1 in which said second clutch means connects or disconnects said third generator means to rear axle.

8. The electrocombustable vehicle of claim one in which said first clutch means connects or disconnects said first flywheel means from said first generator means.

9. The electrocombustable vehicle of claim 1 in which said second clutch means connects or disconnects said second flywheel means from said third generator means.

10. The electrocombustable vehicle of claim 4 in which first clutch means disconnects said first flywheel means from front axle at selected velocities allowing the stored kinetic, mechanical power to rotate said flywheel and produce a mechanical input to said first generator means allowing said generator to produce a voltage while the vehicle is stoped and the motor means is deactivated.

11. The electrocombustable vehicle of claim 5 in which second clutch means disconnects said second flywheel means from rear axle at selected velocities allowing the stored kinetic, mechanical power to rotate said flywheel and produce a mechanical input to said third generator means allowing said generator to produce a voltage while the vehicle is stoped and the motor means is deactivated.

12. The eletrocombustable vehicle of claim 1 in which said first and second means for storing electrical energy are connected in series.

13. The electrocombustable vehicle of claim 1 (h) in which said velocity dependent moving portion of the electric vehicle comprises a wind activated fan.

14. The electrocombustible vehicle of claim 1 in which said first and second kinetic, mechanical storage means retains their stored kinetic, mechanical power while the vehicle is stopped, stored, and said motor means is deactivated, and said flywheels have stopped movement thus, when the vehicle is in this stored state the release means of said kinetic, mechanical storage means can be activated allowing a mechanical input to said fourth and fifth generator means allowing partial recharging of said first and second storage means while the vehicle is in storage.

15. The electrocombustable vehicle of claim 1 in which said first and second kinetic, mechanical storage means release their stored power allowing a mechanical input to said fourth and fifth generator means while the vehicle has a velocity.

* * * * *